US006487421B2

(12) United States Patent
Hess et al.

(10) Patent No.: US 6,487,421 B2
(45) Date of Patent: Nov. 26, 2002

(54) METHOD FOR INPUTTING INFORMATION TO A MOBILE RADIOTELEPHONE

(75) Inventors: Jurgen Hess, Bochum (DE); Holger Hussmann, Marl (DE); Peter Decker, Marl (DE); Guy Alexander Hooker, New Plymouth (NZ)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/153,720

(22) Filed: Sep. 15, 1998

(65) Prior Publication Data

US 2002/0065104 A1 May 30, 2002

(30) Foreign Application Priority Data

Sep. 16, 1997 (GB) .............................................. 9719584

(51) Int. Cl.[7] ................................................ H04Q 7/20
(52) U.S. Cl. ...................... 455/550; 455/556; 455/557; 345/863; 345/173
(58) Field of Search ................................. 455/550, 556, 455/557; 345/863, 173

(56) References Cited

U.S. PATENT DOCUMENTS

| 5,138,329 A | 8/1992 | Saarnimo et al. ............ 343/702 |
| 5,168,982 A | 12/1992 | Hakanen et al. ............. 200/342 |
| 5,313,661 A | 5/1994 | Malmi et al. ............... 455/232.1 |
| 5,754,645 A | 5/1998 | Metroka et al. ............. 379/433 |
| 6,058,304 A | * 5/2000 | Callaghan et al. ........... 455/422 |

FOREIGN PATENT DOCUMENTS

| EP | 0 439 340 | | 7/1991 | |
| EP | 0 439 340 A2 | | 7/1991 | |
| JP | 7-721293 | | 10/1995 | |
| JP | 7-336759 | * | 12/1995 | ............ H04Q/7/32 |
| WO | WO 94/18663 | | 8/1994 | |
| WO | WO 95/10818 | | 4/1995 | |

OTHER PUBLICATIONS

Patent Abstracts of Japan JP 09 130507.
Patent Abstracts of Japan JP 05 274082.
Patent Abstracts of Japan JP 10 210128.
Japanese Application No. JP 8016301—with English translation.
Japanese Application No. JP 7–336759—with English translation.
Product Announcement for Nokia 9000 Communicator PDA, 2 pages.
United Kingdom Search Report.

* cited by examiner

Primary Examiner—Daniel Hunter
Assistant Examiner—Alan T. Gantt
(74) Attorney, Agent, or Firm—Perman & Green LLP

(57) ABSTRACT

The invention relates to a method for inputting information into a mobile radio telephone (1) via its input data channel by appropriately moving a motion detector (10) which belongs to the radio telephone (1) and senses this movement. In this arrangement, the mobile radio telephone (1) can be constructed to be pen-shaped and can contain the motion detector (10) in its pen point.

36 Claims, 5 Drawing Sheets

METHOD FOR INPUTTING INFORMATION TO A MOBILE RADIOTELEPHONE

In the field of mobile communications, subscribers now expect ever smaller and lighter radio telephones which they can carry with them at all times and which, in addition, are easy to operate.

BACKGROUND OF THE INVENTION

At present mobile radio telephones usually have a numeric keypad for inputting directory numbers but also for inputting characters in order to store, for example, the name of a subscriber with the associated directory number. Later, the name of the subscriber is retrieved from the memory of the telephone and the associated directory number is automatically dialled.

Furthermore, it is possible in today's radio telephone networks to send short messages via the so-called Short Message Service (SMS). These short messages are input via the numeric keypad which, for this purpose, is set to a mode which makes it possible to input letters.

In addition to the usual numeric keypad, mobile radio telephones also have some additional function keys and a menu structure, for example to facilitate the selection of the name of a stored subscriber. In the final analysis, however, utilization of the functions described above with the usual keypads remains extremely difficult and cumbersome.

As the miniaturization of mobile radio telephones increases, however, the usual keypad will also no longer be suitable for carrying out the functions described above. This is known, for example, from pocket calculators integrated in wrist-watches which can now only be operated with the point of a pen or similar objects.

To facilitate at least the selection of directory numbers from a memory, today's mobile radio telephones are equipped with a small hand wheel or with multi-function keys which, however, do not provide any help when inputting words.

A mobile phone which is constructed in the form of a pen and which has a digit input unit in which the digits are preselected by rotating the pen point and selected by pressing a button is already known from DE 42 94 697 C2. The mechanical structure of this mobile telephone is quite complicated and therefore susceptible to faults. In addition, a large amount of time is needed for inputting information.

Last but not least, a dictating pen for deaf/mute persons is known from JP 7-271 293. The dictating pen contains in its point an acceleration sensor device which detects the movement of the pen and converts characters written with it into language. The electrical voice signals can also be coupled into a telephone line, either directly or via a microphone connection of a microphone present in a telephone handset.

The invention is based on the object of simplifying the inputting of information and making it more flexible with respect to the type of information which can be input even in mobile radio telephones which are miniaturized further.

BRIEF SUMMARY OF THE INVENTION

In the method according to the invention, information is input into a mobile radio telephone via its input data channel by appropriately moving a motion detector which belongs to the radio telephone and senses this movement.

Mobile radio telephones usually have an acoustic channel via which information spoken using a microphone can be input into the telephone. In addition, there is an input data channel via which information can be input into the telephone, for example by keys or other mechanical input means. The invention makes use of this input data channel for additionally transmitting signals from the motion detector via it, which makes it possible to increase the range of data to be input with respect to their type and, by using the motion detector, to save a large number of input keys so that it is possible not only to simplify the inputting of information via the input data channel but also, by saving input means, to enable the mobile radio telephone to be miniaturized further.

Any information which can be represented graphically by moving the motion detector can be input via the input data channel. This can be letters, digits, symbols, lines or other graphic elements or figures or technical representations composed of these.

The information input in this manner can be used for a wide range of purposes. For example, it can be input for carrying out dialling processes, for the transmission of short messages or longer texts to a subscriber or even for transmitting entire technical representations or tables, the information transmitted to the subscriber then being displayed there, for example on a suitably constructed monitor or can be output via a printer, for example. In this case, the monitor could be present, for example, in a mobile communication device which is equipped with telephone functions whilst the printer, for example, could be that of a facsimile machine equipped with telephone functions.

According to one embodiment of the invention, the entire radio telephone, and with it the motion detector, is moved for inputting the information. In contrast, according to another embodiment of the invention an input device belonging to the radio telephone and accommodating at least the motion detector can be moved for inputting the information. Both options allow the information to be input in a particularly simple manner and thus lead to very good manageability of the telephone.

The information input in this manner can in principle be transmitted as it is from the telephone to the subscriber. However, it is also possible to compare the input information with information already present in the radio telephone for recognition of the input information. This variant is selected especially if a dialling process is to be carried out via the input information or if it is intended for transmitting short messages in text form or longer texts. In this case, greater reliability with respect to the correctness of the information input or transmitted is achieved.

The information input or recognized can also be temporarily stored in the radio telephone in a further development of the invention. With respect to the input information, this applies, for example, to graphic representations which are first generated by the input process and are stored in a buffer memory before the stored data are sent to the receiver, for example in packet form. With respect to detected information, this applies, for instance, to input telephone numbers which are first temporarily stored before a dialling process can be initialized.

On the other hand, information input or recognized can naturally also be transmitted on-line, although in some cases this may require more transmitting time, especially where drawings are transmitted.

If information is input via the input device which is separate from the rest of the radio telephone, the information can be transmitted from the said device to the rest of the radio telephone via a cable or via a radio link in order to be transmitted from there to the subscriber, possibly after further processing. During this process, the information input or recognized can be displayed by the radio telephone itself or in the case of the two-part construction, by the input device or the rest of the radio telephone. A user can therefore check the input information with respect to its correctness.

To ensure reliable operation of the radio telephone, it can be switched to an information input mode which is selected from a menu by operating a selection device for inputting information. In this connection, predetermined characters input in the information input mode can be used for grouping input information. Thus, input digits can be assembled into complete telephone numbers, characters into character groups, letters into words and drawing elements into a graphic representation or technical drawings.

According to an advantageous embodiment of the invention, accelerations in different directions are measured by the motion detector for inputting information. This detector can exhibit sufficient acceleration sensors to sense movements in one plane or movements in space. Advantageously, therefore, two or three acceleration sensors, respectively, which measure accelerations in mutually perpendicular directions are used in the motion detector. The input information can be deduced from the measured accelerations, appropriate algorithms being available for this purpose. If it is intended, for example, to input characters (letters or digit), these algorithms, which are generally known, ensure unambiguous recognition of the characters irrespective of which hand a user is using for guiding the telephone or the input device or how the telephone or input device are held in space. If necessary, the radio telephone can be informed in a preparatory step where left and right are located, as an orientation aid, namely by drawing an appropriate line and temporarily storing the corresponding acceleration vector. Recessed cups for the fingers can also be of assistance for orientating the writing position of the telephone.

Naturally, a radio telephone of the type according to the invention must also know the point from which movements are to be interpreted as information to be input so that it does not continuously record every movement. For this purpose, appropriate initialization means can be present, especially in the motion detector equipped with acceleration sensors, for example a switch at the point of the radio telephone or the input device which is operated by placing it on a base and thus signals that information input thereafter is to be regarded as useful information. This switch could also be activated by a voice command.

In a further embodiment of the invention, the motion detector can also measure distances travelled by it in different directions on a base for inputting information. This distance measurement can be carried out by means of a roller ball such as is used, for example, in computer mice. It is also possible, however, to perform the distance measurement by optically scanning lines present on the base by means of a transmitter and a number of receivers. If lines extending in different directions exhibit information about these directions, for example different colours, a position can be determined and thus a distance measured by counting the respective lines in the different directions. The measured distances can in this case, as in the case of detection by means of a roller ball, then be processed by suitable algorithms in order to reproduce the input information electronically. In this connection, character recognition programs can also be used in order to be able to recognize unambiguously, for example, input digits or letters.

According to the invention, a mobile radio telephone contains a motion detector for inputting information represented by movement of the motion detector via the input data channel of the telephone. As already mentioned, the telephone can be constructed in one part in order to obtain a compact unit. However, it can also comprise an input device which is separate from a main telephone unit and in which the motion detector is accommodated. In this arrangement, radio telephone or input device can be constructed in the form of a pen, leading to an extraordinarily miniaturized model of a radio telephone. If the input device is also equipped with loudspeaker and microphone, it can be used as a voice communication unit and can communicate with the main telephone unit via a cable or cordless link like infrared, radio or ultrasonic link.

As already mentioned, the mobile telephone according to the invention can contain a character recognition device for recognizing information by comparing the input information with information already present. The recognition device is for example able to recognize characters (letters and numbers) and symbols. Also signs patterns and signatures stored by the user can be recognized. The character recognition device may be activated in a particular operation mode to be set in the radio telephone. In this arrangement, the recognition device can be either in the input device or in the main telephone unit in the case of the two-part radio telephone. In the last-mentioned case, this allows the input device to be of simpler and even lighter construction. The recognition unit can also be partitioned between the input device and the main telephone unit. The amount of data to be transmitted between the input unit and the main telephone is reduced if a kind of preprocessing of the recognition is carried out within the input device.

BRIEF DESCRIPTION OF THE DRAWINGS

In the text which follows, illustrative embodiments of the invention will be explained in detail with reference to the drawings, in which:

FIGS. 1 and 2 show a first illustrative embodiment of a mobile radio telephone according to the invention.

DETAILED DESCRIPTION OF THE INVENTION

Figure 1:
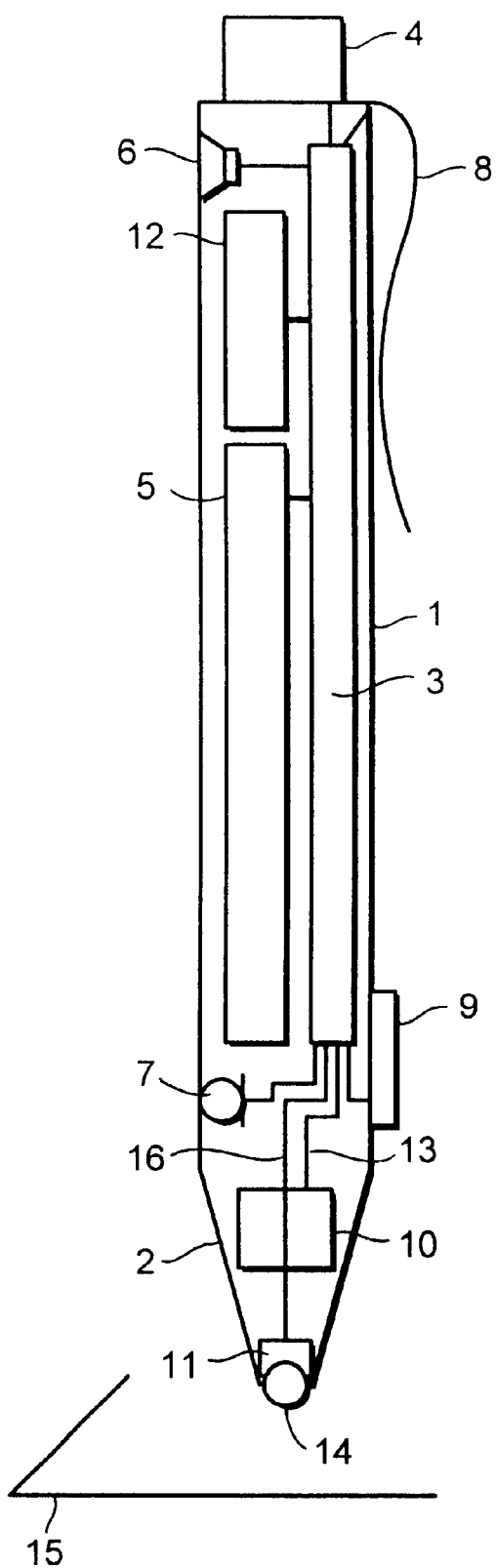
FIG. 1 shows a cross-section through a one-part mobile radio telephone.

According to FIG. 1, the mobile radio telephone 1 is constructed in the form of a pen which can have a round or polygonal cross-section. At its lower end 2, the radio telephone 1 tapers to a point and is held by the hand of a subscriber in the manner of a pencil when in use.

In the present case, the mobile radio telephone 1 is constructed in one part and contains in its interior all the elements required for its operation. These include an electronic circuit 3 for controlling the operation of the radio telephone 1. A main switch 4 for switching the radio telephone 1 on and off, a display device 5 for electronically displaying information, a loudspeaker 6, a microphone 7, an antenna 8, a menu selection device 9, a motion detector 10 comprising a number of acceleration sensors, and a switch 11 are connected to this electronic circuit 3. A voltage supply circuit 12 with a battery is used for supplying the electronic circuits contained in the radio telephone 1 with power.

The main switch 4 is arranged at the end opposite to the pointedly tapered end 2 of the radio telephone 1 and can be constructed as a push button key which can be displaced in the longitudinal direction of the radio telephone 1. At this end of the radio telephone 1, the loudspeaker 6 is located on one side and the antenna 8 is located on the opposite side. The antenna 8 can be constructed in the form of a resilient metal clip with which the radio telephone 1 can be clamped to a carrier, for example the edge of a pocket. The display device 5 extends in the longitudinal direction of the radio telephone 1 and can be constructed as a segmented display device or flat display, for example as an LCD display. Directly in front of the lower and pointedly tapered end 2 of the radio telephone 1 are the microphone 7, on one side, and the menu selection device 9, on the opposite side. The latter can be constructed as a push button. Accommodated in the interior of the pointedly tapered lower end 2 of the radio telephone 1 is the motion detector 10 which, depending on the embodiment, contains two or three acceleration sensors in order to be able to measure accelerations of the point area of the radio telephone 1 in two or three mutually perpendicular directions. The corresponding acceleration signals are transmitted to the electronic circuit 3 via a line 13. The switch 11 is located at the point of the lower end 2 of the radio telephone 1 and comprises, for example, a spherically constructed operating element 14 which partially protrudes from the lower end 2 of the radio telephone 1. If the radio telephone 1 is placed with its point on a base 15, the operating element 14 is pushed slightly inwards and thereupon applies a load to the switch 11 so that the latter transmits a corresponding identification signal via a line 16 to the electronic circuit 3.

Figure 2:
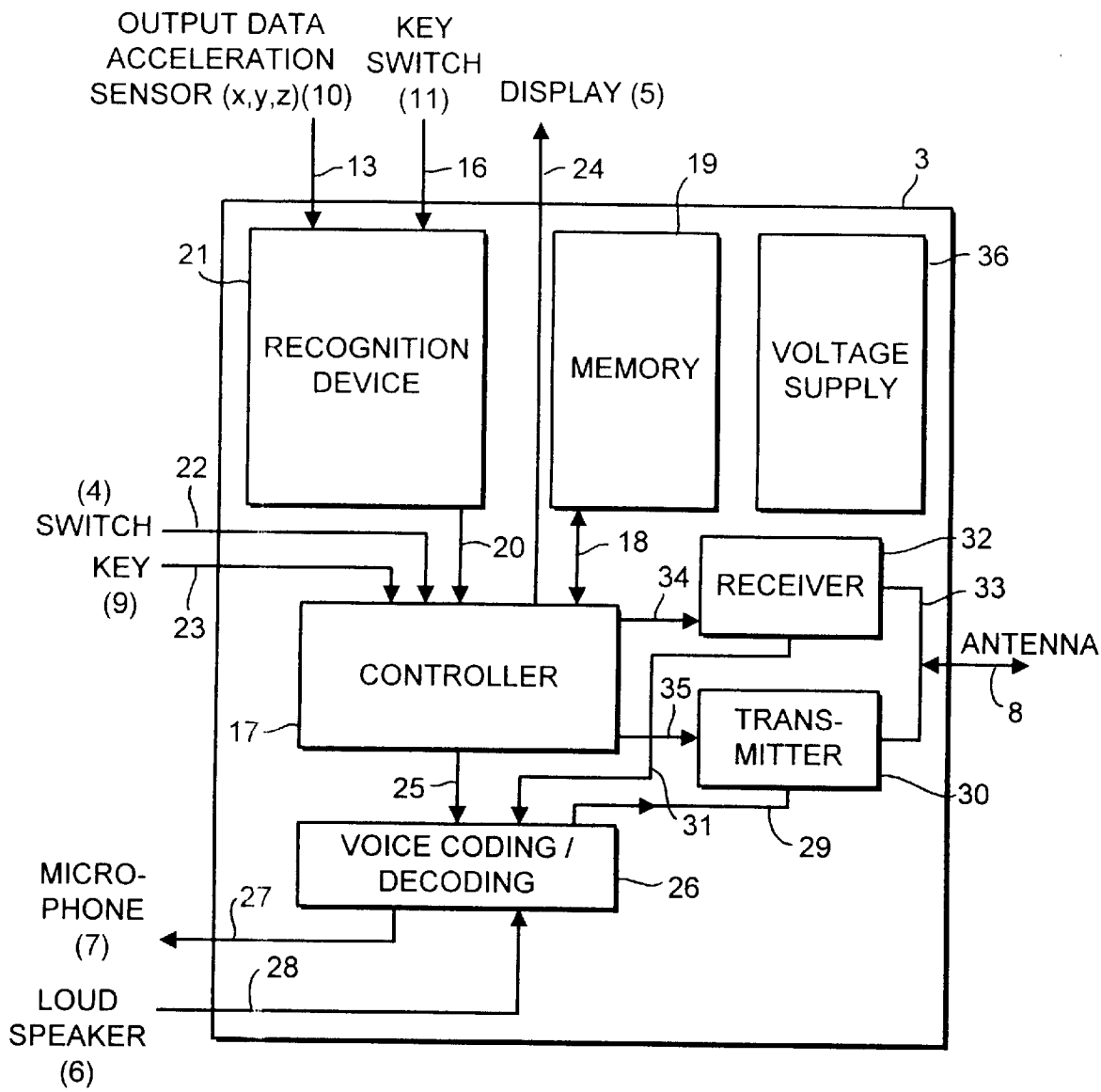
FIG. 2 shows an electric circuit configuration of the radio telephone according to FIG. 1.

The configuration of the electronic circuit 3 is shown in detail in FIG. 2.

The electronic circuit 3 contains a central controller 17 to which an electronic memory 19 for storing data is connected via a line 18. In the electronic memory 19, operational control data and useful information can be stored. The central controller 17 is also connected via a line 20 to a recognition device 21 which is supplied with the acceleration signals measured by the motion detector 10 via the line 13. The recognition device 21 also receives the identification signal from the switch 11 via line 16.

The branch from line 13 via the recognition device 21 to the central controller 17 represents an input data channel which corresponds to the one via which data generated by a keypad are transmitted to the central controller 17 in a conventional arrangement.

The central controller 17 is also connected to the main switch 4, the menu selection device 9 and the display device 5 via lines 22, 23 and 24 respectively.

On the other hand, the central controller 17 controls a voice coding/decoding station 26 via a line 25. This station is connected to the microphone 7 via a line 27 and to the loudspeaker 6 via a line 28. The voice coding/decoding station 26 sends sound information to a transmitting station 30 via a line 29 and receives sound information from a receiving station 32 via a line 31. In this arrangement, the transmitting station 30 and the receiving station 32 are connected to the antenna 8 via a line 33. Both stations 30 and 32 can additionally be supplied with data by the central controller 17 via lines 34, 35.

In contrast to the input data channel described above, lines 27, 28, together with the voice coding/decoding station, form a sound channel of the radio telephone 1 for transmitting voice signals.

Last but not least, a voltage supply 36 is provided in the electronic circuit 3 for supplying the elements present therein with energy.

Figure 3:
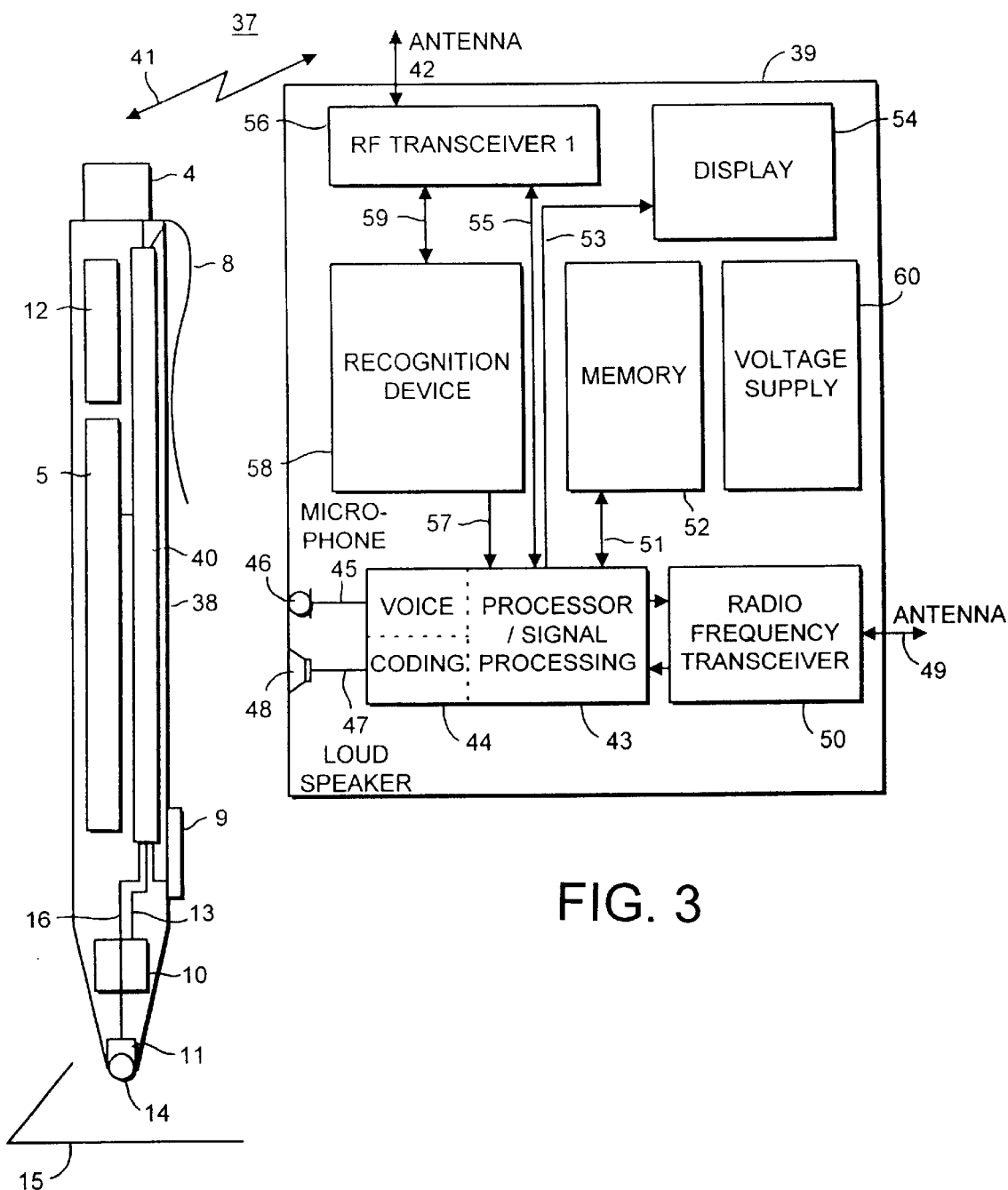
FIG. 3 shows the diagrammatic configuration of a two-part mobile radio telephone with input device and separate main telephone unit.

A second illustrative embodiment of a mobile radio telephone according to the invention is shown in FIG. 3. This is a two-part embodiment of a mobile radio telephone 37 comprising an input device 38 and a main telephone unit 39.

The input device 38 is constructed to be pen shaped and its configuration essentially corresponds to the configuration of the radio telephone of FIG. 1. To avoid repetitions, items identical to those in FIG. 1 are provided with the same reference symbols and are not described again.

In deviation from the configuration of the radio telephone 1 according to FIG. 1, the input device 38 according to the second illustrative embodiment in FIG. 3 does not contain a loudspeaker or microphone and the electronic circuit 3 present in the first illustrative embodiment according to FIG. 1 is replaced by an RF transceiver 40. This RF transceiver is connected to the main switch 4, the display device 5, the antenna 8 and the menu selection device 9 and receives the measured acceleration signals from the motion detector 10 and the identification signal from the switch 11 via lines 13 and 16, respectively. The measured acceleration signals from the motion detector 10 are not processed further in the input device 38 but are transmitted directly to the main telephone unit 39 via a radio link 41 in dependence on the recognition signal from the switch 11. Instead of this radio link 41, there could also be a corresponding transmission line between the units 38 and 39. The radio link 41 is located between the antenna 8 and an antenna 42 of the main telephone unit 39.

The main telephone unit 39 is configured similarly to the electronic circuit 3 of FIG. 2. It contains a central controller 43 with voice coding/decoding station 44 which is connected to a microphone 46 via a line 45 and to a loudspeaker 48 via a line 47 in order to form a voice channel. Microphone 46 and loudspeaker 48 thus belong to the main telephone unit 39. It also contains a main antenna 49 which is connected to the central controller 43 via a radio-frequency transceiver 50.

The central controller 43 is also connected to an electronic memory 52 for storing control data and useful data via a line 51, to a display device 54 for displaying information via line 53, to an RF transceiver 56, which is connected to the antenna 42, via a line 55, and to a recognition device 58 via a line 57 which device, in turn, is connected to the RF transceiver 56 via a line 59.

The main telephone unit 39 also contains a voltage supply 60, for instance a battery, for supplying the individual elements.

In the illustrative embodiment according to FIG. 3, after transmission of the acceleration signals measured by the motion detector 10 via the radio link 41 to the main telephone unit 39, the respective characters, patterns, symbols or signs are evaluated or recognized in the recognition device 58 and can be displayed on the display device 54 or transmitted to the subscriber in the usual manner via the antenna 49. It is possible to transmit these recognized characters, patterns or signs back to the input unit 38 via the radio link 41 in order to be able to display them on the display device 5 as well.

In the second illustrative embodiment according to FIG. 3, the branch from the antenna 42 via the RF transceiver 56 and the recognition device 58 forms the input data channel whilst the sound channel of the main telephone unit 39 extends via the voice coding/decoding station 44.

In deviation from the embodiment according to FIG. 3, the input device 38 could also contain a loudspeaker and a microphone so that the input device could also be used as a voice communication unit. In addition, the central controller 43 could also handle other tasks and not just those which are necessary for operating a mobile radio telephone. In particular, the central control device 43 could also be constructed as a computer or be combined with one in order to be able to handle, for example, data management tasks.

Figure 4:
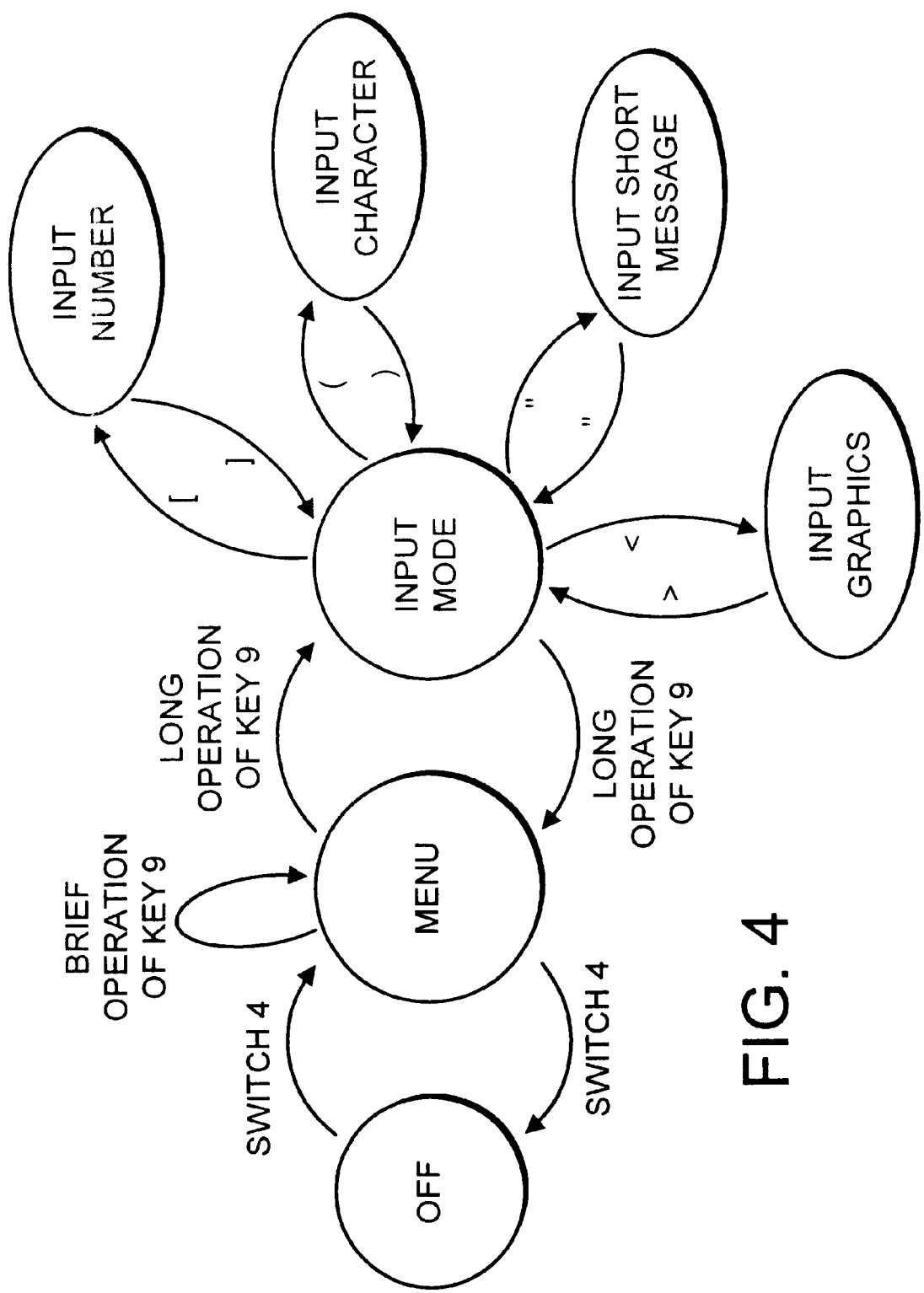
FIG. 4 shows a diagram to explain the operation of the radio telephones according to FIGS. 1 and 3.

In the text which follows, the operation of the mobile radio telephones according to the first and second illustrative embodiments will be explained in greater detail with reference to FIG. 4.

To turn on the mobile radio telephone 1 or 37, the switch 4 is first operated. This provides the menu of the radio telephone, which can be perused by operating the menu selection device 9. The menu selection device 9 can be constructed as a key switch and can be located, as already mentioned, at the lower end of the telephone 1 or the input device 38. Individual menu items can be presented in each case by briefly operating the key 9 with one's finger, for example "input mode", "dial number", "send short message (SMS)", "store name", "store numbers", etc. After such a menu item has been presented, the key 9 is operated again for a prolonged period so that the presented menu item is selected. In FIG. 4, the menu item "input mode" has been set by prolonged operation of the key 9.

In this operating mode "input mode", various information items can be input into the radio telephone. For this purpose, the functions "input number", "input character", "input short message", "input graphics", etc. can be selected. Selection of a function is carried out by inputting predetermined symbols, for example by inputting square brackets for the case of the function "input number".

In order that the recognition device recognizes that a number, for example a directory number, will be input next, the user first inputs the symbol "[" by writing this symbol onto a base or copying it in space, depending on the embodiment of the motion detector, with the aid of the telephone or input device which is constructed to be pen shaped. The recognition device recognizes this symbol and forwards the information to the central controller or the processor which now knows that a directory number to be dialled will be input next.

The user now successively writes each individual digit of the directory number to be dialled by using the telephone in the manner of a pen.

Each recognized digit is forwarded by the recognition device 21 or 58 to the processor, which causes this digit to be displayed on the display 5 and/or 54, so that the user knows what digit has been input last in this manner.

After all the digits have been written or input, the user writes the symbol "]". The recognition device forwards this symbol to the processor 17 or 43, which concludes from this that the input process has been completed.

The user gets back into the menu by a further prolonged operation of the key 9.

The key 9 is now operated briefly in each case until the menu item "dial numbers" is reached. A long operation of the key 9 then causes the processor 17 or 43 to establish a connection to the radio telephone network via the RF transceiver device 30, 32 or 50 and to set up the connection to the corresponding subscriber via this network.

To terminate the connection after a call has ended, the key 4 can again be operated.

In some cases the processor 17, 43 may automatically recognize that when the symbol "]" is input, the inputting of a number has ended, with the result that it can automatically initiate the setting up of a connection to the subscriber without the user having to return to the menu.

In the text which follows, another illustrative use will be explained with reference to FIG. 4. This is the storage of a directory number with associated name.

Firstly, the abovementioned steps are repeated up to the step in which the symbol "]" is input. The key 9 is now operated briefly in each case until the menu item "store number" appears. After that, the number is stored by prolonged operation of the key 9 and "input name" appears on the display 5 and/or 54. The telephone has now automatically selected the function "input characters".

The user now starts to input characters by writing the symbol "(" and successively inputs each letter of the required name. After recognition by the character recognition device 21 or 58, the letters are automatically displayed on display 5 and/or 54.

Finally, the user inputs the symbol ")" so that the processor, after recognising and processing this symbol, automatically stores the name with the previously entered directory number in memory 19 or 52, of the mobile radio telephone 1 or 37.

For the case of dialling a stored directory number by using a stored subscriber name, there is the option of menu selection or the option of written input.

In the case of menu selection, the user activates the radio telephone by pressing the switch 4 and works through the menu in each case by briefly operating the key 9 until, for example, the display "select name" appears. Long operation of the key 9 gets the user into this menu item and he can work through memory 19 or 52, by briefly operating key 9, until the desired name appears. Long operation of key 9 then automatically dials the associated directory number and the connection is established.

In the case of written input, the user again activates the telephone by pressing the switch 4 and works through the menu in each case by briefly operating the key 9 until the menu item "input mode" appears. Long operation of the key gets the user into this input mode and he can enter the letters of the name after inputting the symbol "(". This, once again, is done by a writing process in which the pen-shaped telephone is held and guided in the manner of a writing pen. After the input has been ended by inputting the symbol ")", the user again keys through the menu by in each case briefly operating the key 9 until the display "select name" appears. Key 9 is now pressed for a relatively long time and the input name is then searched for in memory 19 or 52 and, in the case of a success, a connection is established to the associated directory number.

Functions such as sending a short message and similar can be executed in the same manner as the functions described here. In particular, inputting the symbol "<" allows the function "input graphics" to be selected so that figures or technical representations can now also be temporarily stored in the memory 19 or 52, by appropriately moving the radio telephone. After the symbol ">" has been input, another menu item, for example one in which the temporarily stored drawing is transmitted to another subscriber, can then be selected by in each case briefly operating the key 9.

Figure 5:
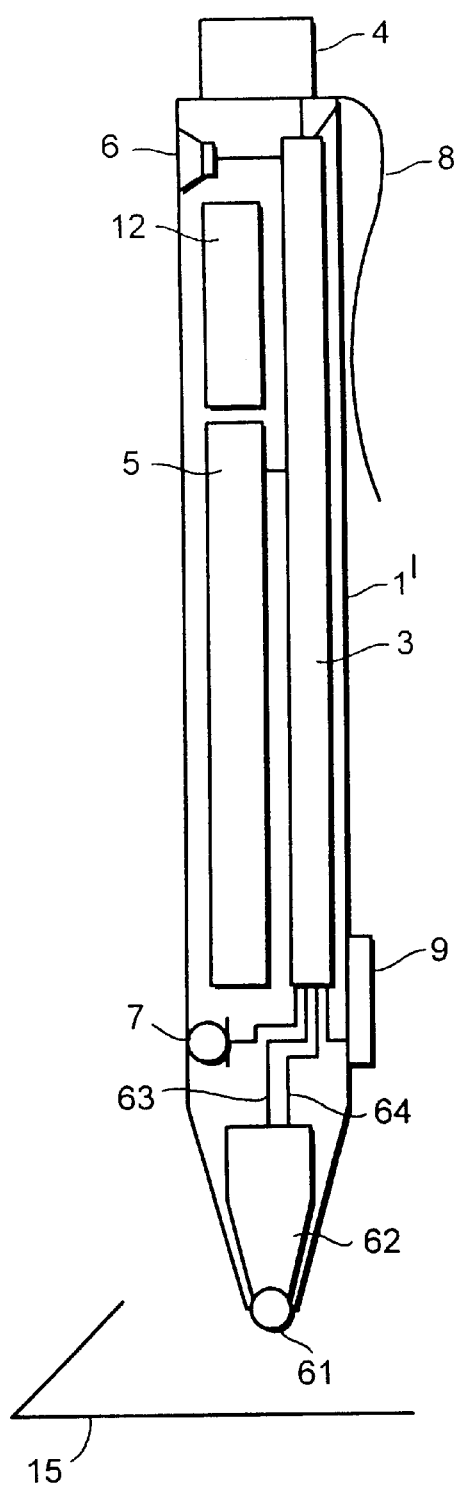
FIG. 5 shows the diagrammatic configuration of another illustrative embodiment of the mobile radio telephone according to the invention with a roller ball.
Figure 6:
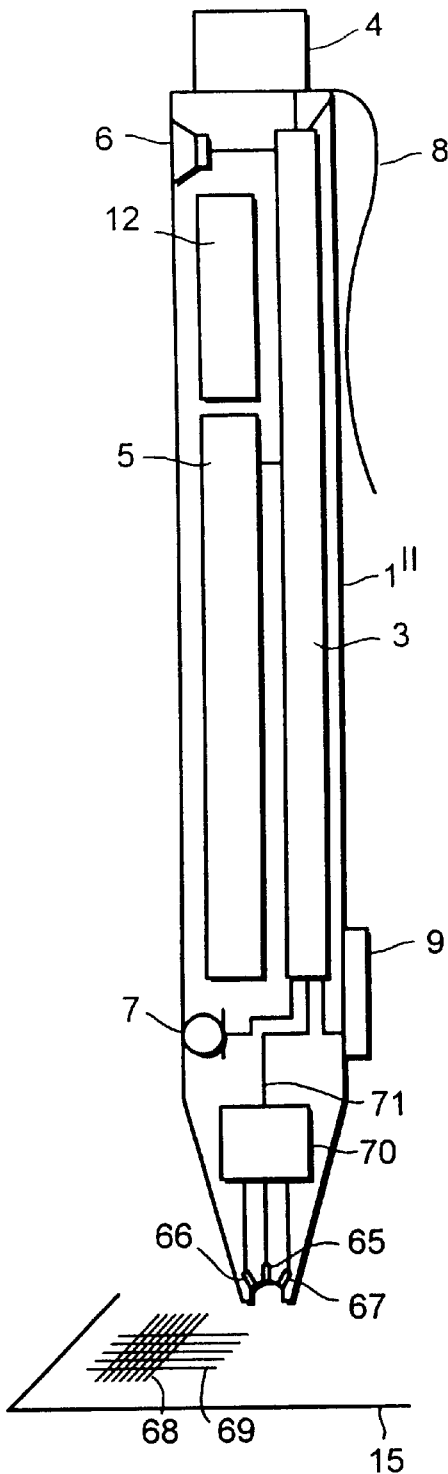
FIG. 6 shows yet another illustrative embodiment of the mobile radio telephone according to the invention with an optical motion detector.

FIGS. 5 and 6 show a third and fourth illustrative embodiment of a radio telephone 1', 1". These are again one-part embodiments according to the embodiment of FIG. 1, so elements identical in FIG. 1 are provided with the same reference symbol and will not be described again.

Motion detector 10 and switch 11 in the illustrative embodiment of FIG. 1 are replaced by a travel measuring device 62 equipped with a roller ball 61 in the third illustrative embodiment according to FIG. 5. This can be a travel measuring device with roller ball such as is used, for example, in computer mice. With this device, travel measurements are possible in two mutually perpendicular directions when the roller ball 61 is rolled along a base. The corresponding measured signals are transmitted via a line 63 to the electronic circuit 3 and evaluated by the recognition device 21 according to FIG. 2 in order to be able to recognize written characters or other symbols or graphics. In this arrangement, the roller ball 61 can also be elastically supported in order to operate a switch present in the travel measuring device 62 when it is placed onto the base 15 in order thus to transmit an identification signal for beginning character recognition via the switch to the electronic circuit 3 via a line 64.

In the fourth illustrative embodiment according to FIG. 6, there is an optical sensor device located in the point of the radio telephone 1". This optical sensor device consists of a centrally positioned transmitting device 65 for sending out light in the direction of the base 15 and of two optical receivers 66 and 67, arranged laterally thereto and having different spectral sensitivities. Located on the base 15 are respectively parallel lines 68, 69 which are relatively close together and extend in two mutually perpendicular directions. Lines 68, 69 have a colour matching the receiving characteristic of the optical receivers 66, 67 so that the lines can be counted directionally selectively when the radio telephone 1" is moved over the base 15. In this manner, it is possible to measure the distance travelled by means of the respective counts in order to be able to carry out a recognition on the basis of these measured values. This is again carried out in the recognition device 21 of FIG. 2. The signals output by the optical receivers 66, 67 are conducted via a conditioning circuit 70 and furthermore via a line 71 to the electronic circuit 3. The conditioning circuit 70 also supplies power to the transmitting device 65.

In deviation from the illustrative embodiments 5 and 6, it is naturally also possible to accommodate the respective motion defector devices in an input device according to FIG. 3.

What is claimed is:

1. A method for inputting information into a mobile radio telephone via its input data channel by appropriately moving a motion detector which belongs to the radio telephone and senses this movement, wherein prior to inputting information, an appropriate line is input for orienting said motion detector.

2. A method according to claim 1, wherein the entire radio telephone is moved for inputting the information.

3. A method according to claim 1, wherein an input device belonging to the radio telephone and accommodating at least the motion detector is moved for inputting the information.

4. A method according to claim 1, wherein the input information is compared with information already present in the radio telephone for recognizing said input information.

5. A method according to claim 4, said input information or said recognized information is temporarily stored in said radio telephone.

6. A method according to claim 4, wherein said input information or said recognized information is transmitted on-line.

7. A method according to claim 4, wherein said input information or said recognized information is displayed by said radio telephone.

8. A method according to claim 1 wherein said radio telephone is switched to an information input mode which is selected from a menu by operating a selection device for inputting information.

9. A method according to claim 8, wherein predetermined characters input in the information input mode are used for grouping input information.

10. A method according to claim 1, wherein accelerations in different directions are measured by said motion detector for inputting information.

11. A method according to claim 1, wherein said motion detector measures distances traveled by it in different directions on a base for inputting information.

12. A method according to claim 11, wherein said distance measurement is carried out by means of a roller ball.

13. A method according to claim 11, wherein said distance measurement is carried out by optically scanning lines present on said base.

14. A mobile radio telephone having an orientation motion detector for inputting information represented by movement of the motion detector via the input data channel of the telephone, said detector orienting the device in response to input of an appropriate line prior to data input.

15. A mobile radio telephone according to claim 14, wherein said telephone is constructed in one part.

16. A mobile radio telephone according to claim 14, wherein said telephone further comprises an input device which is separate from a main telephone unit and said motion detector is accommodated in the input device.

17. A mobile radio telephone according to claim 14, wherein a motion detector comprises a number of acceleration sensors for measuring accelerations in different directions.

18. A mobile radio telephone according to claim 14, wherein said motion detector comprises a roller ball for measuring the distances traveled by it in different directions on a base.

19. A mobile radio telephone according to claim 14, motion detector comprises an optical transmitting/receiving device for the directionally selective scanning of lines present on said base.

20. A mobile radio telephone according to claim 14 wherein said telephone or said input device comprises a switch and that when this switch is operated, the information generated by movement of the motion detector can be processed as such.

21. A mobile radio telephone according to claim 20, wherein said switch is a sound activated switch.

22. A mobile radio telephone according to claim 20 said switch is located at a point of said telephone or said input device.

23. A mobile radio telephone according to one of claim 14, wherein said telephone or said input device is constructed in the form of a pen.

24. A mobile radio telephone according to claim 14, said telephone or said input device comprises a selection device for selecting an operating mode in which the information generated by moving said motion detector can be input.

25. A mobile radio telephone according to claim 14, wherein said telephone contains a recognition device for recognizing information by comparing said input information with information already present.

26. A mobile radio telephone according to claim 14, wherein said telephone or said input device is equipped with a display device for displaying the information generated by moving said motion detector or said recognized information.

27. A mobile radio telephone according to claim 16, wherein said input device communicates with the main telephone unit via a cordless link.

28. A mobile radio telephone according to claim 27, wherein said information input during the movement of said motion detectors is transmitted to the main telephone unit via said cordless link.

29. A mobile radio telephone according to claim 27, wherein said input device is equipped with a loudspeaker and a microphone in order to be able to transmit sound signals via said cordless link.

30. A mobile radio telephone according to claim 14 wherein said motion detector is separate from said radio telephone.

31. A mobile radio telephone according to claim 14 wherein said motion detector is incorporated into said radio telephone.

32. A method according to claim 2, wherein said orienting is achieved by moving said motion detector substantially in a predetermined pattern.

33. A method according to claim 32, wherein said orienting, process is achieved by moving said motion detector substantially in a line from left to right for a predetermined distance.

34. A method according to claim 1, wherein said orienting process is achieved through tactile representations on said motion detector, thereby encouraging a user to hold said motion detector substantially in a predetermined orientation.

35. A method according to claim 1, wherein said orienting process is achieved through tactile representations on said radio telephone, thereby encouraging a user to hold said radio telephone substantially in a predetermined orientation.

36. A mobile radio telephone according to claim 14 wherein said orientation is achieved by having tactile representations on said radio telephone, thereby encouraging a user to hold said radio telephone substantially in a predetermined orientation.

\* \* \* \* \*